United States Patent
McCalib, Jr. et al.

(10) Patent No.: US 9,783,376 B1
(45) Date of Patent: Oct. 10, 2017

(54) TOTE HANDLING SYSTEMS AND METHODS

(71) Applicant: Amazon Technologies, Inc., Seattle, WA (US)

(72) Inventors: David Bruce McCalib, Jr., Seattle, WA (US); Brian C. Smith, Luxembourg (LU); Kirkwood Hines, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/471,040

(22) Filed: Mar. 28, 2017

Related U.S. Application Data

(63) Continuation of application No. 15/256,303, filed on Sep. 2, 2016, now Pat. No. 9,637,319.

(51) Int. Cl.
*G06F 7/00* (2006.01)
*B65G 47/76* (2006.01)
*B65G 1/137* (2006.01)

(52) U.S. Cl.
CPC ......... *B65G 47/763* (2013.01); *B65G 1/1378* (2013.01)

(58) Field of Classification Search
None
See application file for complete search history.

(56) References Cited

U.S. PATENT DOCUMENTS

| | | | |
|---|---|---|---|
| 6,450,238 B1 | 9/2002 | Conti | |
| 9,200,362 B2 * | 12/2015 | Higashisaka | C23C 14/50 |
| 2011/0141448 A1 * | 6/2011 | Aoki | B65G 49/064 |
| | | | 355/72 |
| 2013/0166062 A1 | 6/2013 | Casey et al. | |
| 2013/0167751 A1 | 7/2013 | Rosenwinkel | |
| 2016/0304296 A1 * | 10/2016 | Ouellette | B29C 37/0014 |

* cited by examiner

*Primary Examiner* — Yolanda Cumbess
(74) *Attorney, Agent, or Firm* — Lee & Hayes, PLLC

(57) ABSTRACT

An example system includes a first tote handling assembly having a wiper bar, a first plurality of actuators connected to and moveable with the first wiper bar, and a first tab associated with a first actuator of the first plurality of actuators. The system may also includes a second tote handling assembly disposed substantially adjacent and substantially parallel to the first tote handling assembly. The second tote handling assembly includes a second wiper bar, a second plurality of actuators connected to and moveable with the second wiper bar, and a second tab associated with a second actuator of the second plurality of actuators. In such a system, movement of the first wiper bar in a first direction along a transverse axis of the first tote handling assembly, while the first tab is engaged with a tote disposed on the first tote handling assembly, transfers the tote from the first tote handling assembly to the second tote handling assembly.

20 Claims, 4 Drawing Sheets

TOTE HANDLING SYSTEMS AND METHODS

CROSS-REFERENCE TO RELATED APPLICATIONS

This application is a continuation of prior U.S. patent application Ser. No. 15/256,303, filed Sep. 2, 2016, the entire disclosure of which is incorporated herein by reference.

BACKGROUND

Various systems, such as pick-to-order systems, may be used to fulfill complex orders in inventory storage, warehouse, shipping, or other environments. In such systems, pods or other containers may include items required to fulfill one or more orders in an order queue, and may be manually or automatically directed to an operator station. In such systems, a respective tote corresponding to each order in the order queue may also be directed to the operator station. Once the proper pods and totes arrive, an operator at the operator station may remove items from the various pods, and may place a required number of items in the respective totes based on the quantities specified in each order. In order to maximize efficiency at such operator stations, and to minimize the amount of time and effort required for the operator to transfer the required items from the pods to the respective totes, it is typically desirable to synchronize the arrival timing and sequencing of totes at the operator station with the arrival of the various pods.

Although tote handling systems have been developed to facilitate the movement of totes to and from operator stations, and to control the arrival timing and sequencing of such totes, existing systems can be quite expensive due to the number and complexity of components (e.g., right-angle pop-up wheels, motors, etc.) required to provide such functionality. Additionally, due to the number and nature of such components, existing tote handling systems can be time-consuming to manufacture, and are often difficult to operate in order fulfillment environments.

BRIEF DESCRIPTION OF THE DRAWINGS

This detailed description makes reference to the accompanying figures. In the figures, the left-most digit(s) of a reference number identifies the figure in which the reference number first appears. The same reference numbers in different figures indicate similar or identical items.

DETAILED DESCRIPTION

Figure 1:
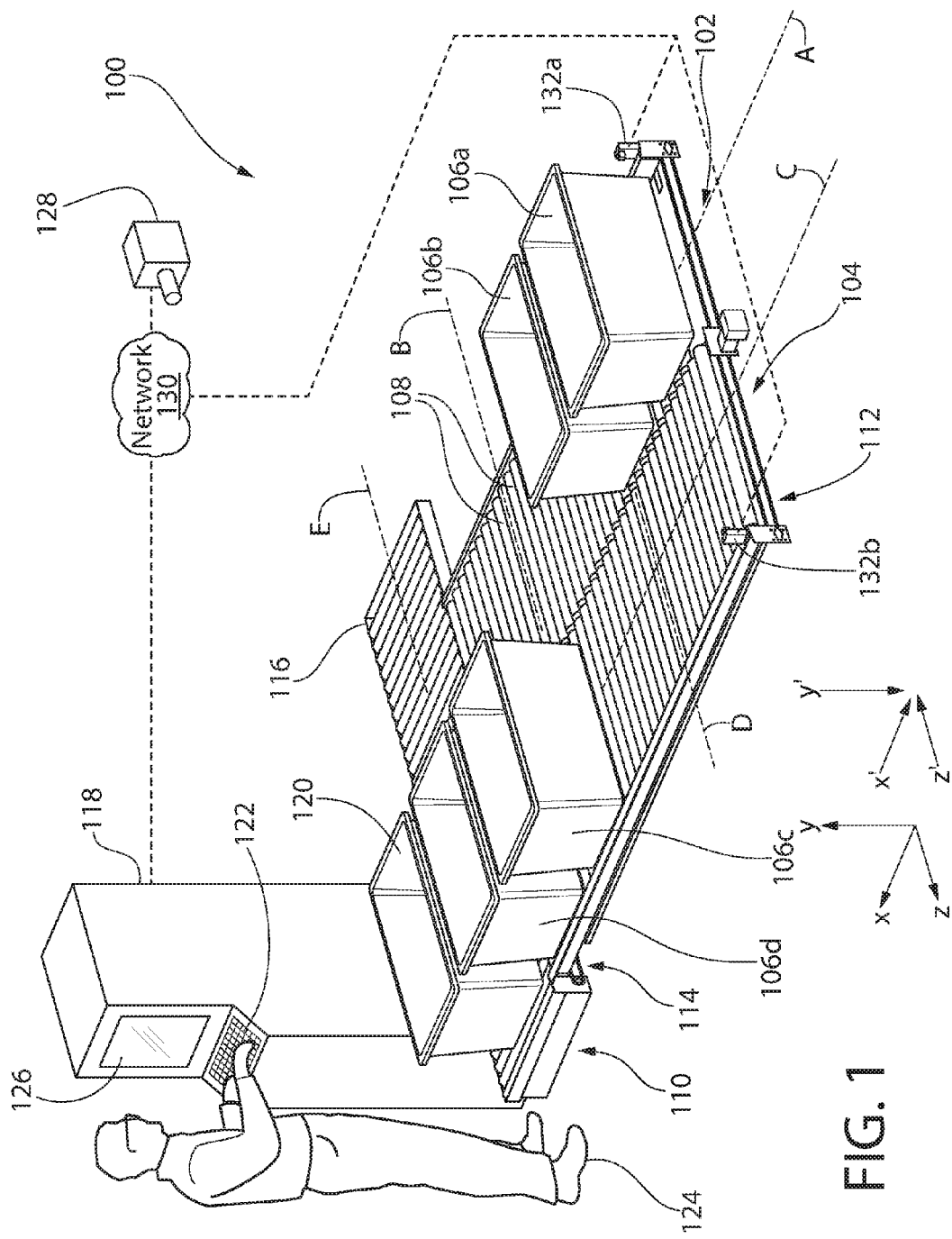
FIG. 1 is a top perspective view of an example system of the present disclosure.

Described herein are systems, apparatuses, and methods related to controlling the arrival timing, sequencing, and other movement parameters of totes within an order-fulfillment environment. The example systems of the present disclosure may be configured to direct a plurality of totes to an operator station in any desired sequence and at any desired time. As a result, operators at the operator station may fulfill orders with increased efficiency. Additionally, the example systems of the present disclosure may employ a unique arrangement of components relative to known tote handling systems. The components included in the example systems of the present disclosure may reduce the cost and complexity of such systems as compared to known systems, and may, thus, improve system reliability.

The example systems of the present disclosure may include one or more tote handling assemblies. In some examples, such systems may include a first tote handling assembly and a second tote handling assembly located substantially adjacent to and substantially parallel to the first tote handling assembly. In such examples, the first tote handling assembly may be substantially similar to and/or the same as the second tote handling assembly, and may include substantially the same components as the second tote handling assembly. Such components may be configured to transfer totes from the first tote handling assembly to the second tote handling assembly, and vice versa. Such components may also be able to move totes along an axis of the tote handling assembly, or in a direction that is substantially parallel to an axis of the tote handling assembly, toward the operator station.

For instance, a tote handling assembly of the present disclosure may include a wiper bar, and one or more actuators coupled to and moveable with the wiper bar. In such examples, the tote handling assembly may define a longitudinal axis and a transverse axis perpendicular to the longitudinal axis. For example, the tote handling assembly may include a frame, and the longitudinal and transverse axes may be longitudinal and transverse axes of the frame. In such embodiments, the wiper bar may extend along substantially an entire length of the frame, and may extend substantially parallel to the longitudinal axis of the tote handling assembly. Additionally, the wiper bar may be moveable along the transverse axis of the tote handling assembly, or in a direction that is substantially parallel to the transverse axis, relative to the frame. In some examples, the tote handling assembly may include one or more motors, linkages, and/or other components operably connected to the wiper bar and configured to move the wiper bar to any desired location along the transverse axis.

Each of the actuators noted above may be coupled to the wiper bar, and a respective tab may be connected to each actuator. In such examples, each actuator may be configured to move the corresponding tab in a vertical direction substantially perpendicular to a plane that includes the longitudinal axis and the transverse axis of the respective tote handling assembly. Such a plane may be, for example, defined by the frame of the tote handling assembly. In such examples, each tab may comprise one or more prongs, fingers, or other components configured to engage a side, bottom, or other portion of a tote disposed on the tote handling assembly.

The tote handling assembly may also include a plurality of substantially cylindrical rollers extending substantially parallel to the transverse axis. The rollers may support the various totes that are disposed on the tote handling assembly, and the wiper bar and actuators may be disposed beneath the rollers. In such examples, each roller of the plurality of rollers may be rotatable in a clockwise direction and a counterclockwise direction relative to the frame. For example, at least one of the rollers may be a motor-driven roller controllable to rotate in the clockwise and counterclockwise directions. Additionally, a first roller may be disposed substantially adjacent to a second roller, and may be spaced from the first roller by a gap. In such examples, a tab connected to an actuator may extend at least partly into the gap while the tab is engaged with the tote. When the tab is engaged with the tote in this way, movement of the wiper bar in a first direction that is along the transverse axis, or that is substantially parallel to the transverse axis, may result in commensurate movement of the tote in the same direction as the wiper bar. In particular, in examples in which the system includes first and second tote handling assemblies as described above, movement of the wiper bar in a first direction that is along the transverse axis, or that is substantially parallel to the transverse axis, may move the tote in the first direction, and may transfer the tote from the first tote handling assembly to the second tote handling assembly.

Further, in examples in which the second tote handling assembly is substantially similar to and/or the same as the first tote handling assembly, such as examples in which the second tote handling assembly includes a wiper bar, one or more actuators fixedly connected to the wiper bar, a respective tab connected to each of the one or more actuators, and/or a plurality of rollers, such components of the second tote handling assembly may be configured to move the tote in a direction that is along a transverse axis of the second tote handling assembly, or that is or substantially parallel to such a transverse axis. In particular, the second tote handling assembly may be configured such that movement of the wiper bar of the second tote handling assembly in a direction that is along, or that is substantially parallel to, the transverse axis of the second tote handling assembly, while a tab of the second tote handling assembly is engaged with the tote, may cause commensurate movement of the tote. In some examples, movement of the wiper bar of the second tote handling assembly, while the tab of the second tote handling assembly is engaged with a tote, may transfer the tote from the second tote handling assembly to the first tote handling assembly.

The functionality described above may enable systems of the present disclosure employing two or more tote handling assemblies to control the arrival timing, sequencing, and other movement parameters of a plurality of totes in an order fulfillment environment. Further, due to the relatively low cost and minimized number of wiper bars, actuators, motors, linkages and other components of the tote handling assemblies described herein, the systems of the present disclosure may be less expensive and less complex than existing tote handling systems.

Referring now to FIG. 1, a detailed example of a system 100 for moving and/or otherwise handling totes in an order fulfilment environment is illustrated. The example system 100 of FIG. 1 may include, among other things, one or more tote handling assemblies 102, 104 configured to support a plurality of totes 106a, 106b, 106c, 106d, . . . 106n (collectively referred to as "totes 106"). In some examples, first and/or second tote handling assemblies 102, 104 of the present disclosure may include a plurality of rollers 108 or other like components configured to support the totes 106 as the totes 106 are moved on or along the tote handling assemblies 102, 104. Such rollers 108 may also support the totes 106 as the totes 106 are transferred from the first tote handling assembly 102 to the second tote handling assembly 104, from the second tote handling assembly 104 to the first tote handling assembly 102, and so on. As will be described in greater detail below, in some examples one or more of the rollers 108 may be powered, motor-driven, and/or otherwise controllable to move one or more of the totes 106 in a desired direction on or along the tote handling assemblies 102, 104.

The system 100 may also include one or more operator stations 110 disposed proximate and/or adjacent to at least part of one or more of the tote handling assemblies 102, 104. For example, the first and second tote handling assemblies 102, 104 may each include a first end 112, and a second end 114 opposite the first end 112. In such examples, the operator station 110 may be disposed proximate and/or adjacent to the first end 112 of at least one of the first tote handling assembly 102 or the second tote handling assembly 104. Alternatively, the operator station 110 may be disposed proximate and/or adjacent to the second end 114 of at least one of the first tote handling assembly 102 or the second tote handling assembly 104. In example embodiments in which the system 100 includes more than a single tote handling assembly 102, the system 100 may be configured to facilitate movement of a plurality of totes 106 between the tote handling assemblies 102, 104 in order to direct the individual totes 106 to the operator station 110 in a desired sequence and/or at a desired time. For example, respective totes 106 of the present disclosure may be directed to the operator station 110 in a sequence and/or at a specified time corresponding to the various orders that are to be completed at the operator station 110. Each of the tote handling assemblies 102, 104 may include a plurality of components configured to assist in transferring one or more totes 106 from the first tote handling assembly 102 to the second tote handling assembly 104, or vice versa such that various respective totes 106 may be directed to the operator station 110 in such a desired sequence and/or at such a specified time. Such components will be described in greater detail below with respect to FIGS. 2-4.

As shown in FIG. 1, the first tote handling assembly 102 may define a longitudinal axis A, and a transverse axis B extending perpendicular to the longitudinal axis A. Similarly, the second tote handling assembly 104 may define a longitudinal axis C and a transverse axis D extending perpendicular to the longitudinal axis C. In examples in which the first tote handling assembly 102 is disposed substantially adjacent to, and/or substantially parallel to the second tote handling assembly 104, the longitudinal axis A of the first tote handling assembly 102 may extend substantially parallel to the longitudinal axis C of the second tote handling assembly 104. Likewise, in such examples, the transverse axis B of the first tote handling assembly 102 may extend substantially parallel to the transverse axis D of the second tote handling assembly 104. Further, in some examples the longitudinal and transverse axes A, B of the first tote handling assembly 102 may define and/or may otherwise be included within a single plane associated with the first tote handling assembly 102. In such examples, one or more rollers 108 of the first tote handling assembly 102 may be disposed within and/or may extend substantially parallel to such a plane. For example, each of the rollers 108 may extend substantially parallel to the transverse axis B of the first tote handling assembly 102, and in some examples, each of the rollers 108 may extend along, and/or may otherwise be disposed within the plane defined by the longitudinal and transverse axes A, B. In such examples, each of the rollers 108 may be coplanar.

Some examples, the rollers 108 may comprise a plurality of motor-driven rollers, and each of the rollers 108 may be rotatable in the clockwise and counterclockwise directions. For example, each individual roller 108 may be independently controlled to rotate relative to a frame and/or other component of the first tote handling assembly 102. It is understood that such rotation in the clockwise or counterclockwise direction may cause corresponding movement of one or more totes 106 supported by the rollers 108 in a direction X that is along or substantially parallel to the longitudinal axis A of the first tote handling assembly 102 or in a direction X' that is along or substantially parallel to the longitudinal axis A. In such examples, one or more of the rollers 108 may include a respective motor, drive, permanent magnet, wire coil, solenoid, servo, or other component configured to impart a rotational force on the roller 108 and/or otherwise cause the roller 108 to rotate in the clockwise or counterclockwise direction. For example, each motor or other component may be independently operable to rotate a corresponding roller 108 of the first tote handling assembly 102 in the clockwise direction and in the counterclockwise direction. Such motors may comprise, for example, any electric motor known in the art. In such examples, one or more of the motor-driven rollers 108 may comprise an AC or DC-powered roller manufactured by Itoh Denki USA, Inc. of Wilkes-Barre, Pa.

In example embodiments, the second tote handling assembly 104 may also include one or more rollers disposed within and/or extending substantially parallel to a plane defined by the longitudinal axis C and the transverse axis D of the second tote handling assembly 104. For example, each of the rollers of the second tote handling assembly 104 may extend substantially parallel to the transverse axis D of the second tote handling assembly 104. In such examples, each of the rollers of the second tote handling assembly 104 may be coplanar, and such rollers may comprise a plurality of motor-driven rollers rotatable, in the clockwise and counterclockwise directions. It is understood that, in such embodiments, the rollers of the second tote handling assembly 104 may be substantially similar to and/or the same as the rollers 108 described above with respect to the first tote handling assembly 102.

As shown in FIG. 1, an example operator station 110 may include, among other things, a pod handling assembly 116 and/or a controller 118. An example pod handling assembly 116 may be disposed proximate and/or adjacent to the first end 112 of at least one of the first tote handling assembly 102 or the second assembly 104. Alternatively, the pod handling assembly 116 may be disposed proximate and/or adjacent to the second end 114 of at least one of the first tote handling assembly 102 or the second tote handling assembly 104. In such examples, the pod handling assembly 116 may be separate from the first and second tote handling assemblies 102, 104, and the pod handling assembly 116 may be configured to direct one or more pods 120 containing at least one inventory item to a location substantially adjacent at least one of the first tote handling assembly 102 or the second tote handling assembly 104. For example, as shown in FIG. 1 a pod handling assembly 116 of the present disclosure may be configured to direct a pod 120 to a location proximate and/or adjacent to the second end 114 of the second tote handling assembly 104. In such examples, once a pod 120 is directed to a location proximate and/or adjacent to the second end 114, inventory items may be removed from the pod 120 and disposed in one or more totes 106d, 106c positioned proximate the second end 114. In some examples, such totes 106d, 106c may then be transferred from the second tote handling assembly 104 to the first total assembly 102, and one or more additional totes 106b, 106a may be transferred from the first tote handling assembly 102 to the second tote handling assembly 104 for the fulfillment of further orders.

In example embodiments, the pod handling assembly 116 may be substantially similar to and/or the same as at least one of the first and second tote handling assemblies 102, 104. For example, the pod handling assembly 116 may include a plurality of rollers or other like components configured to support the pods 120 as the pods 120 are moved on or along the pod handling assembly 116. The rollers of the pod handling assembly 116 may be substantially similar to and/or the same as the rollers 108 described above with respect to the first tote handling assembly 102, and the rollers of the pod handling assembly 116 may have the same configurations and other characteristics of the rollers 108. For example, the rollers of the pod handling assembly 116 may support the pods 120 as the pods 120 are transferred between the pod handling assembly 116 and one or more additional pod handling assemblies 116 of other components of the system 100. In some examples, the rollers of the pod handling assembly 116 may comprise a plurality of motor-driven rollers rotatable in the clockwise and counterclockwise directions. For example, each individual roller of the pod handling assembly 116 may be independently controlled to rotate relative to a frame and/or other component of the pod handling assembly 116. Such rotation in the clockwise or counterclockwise direction may cause corresponding movement of one or more pods 120 supported by the rollers of the pod handling assembly 116 in a direction Z that is along or substantially parallel to a longitudinal axis E of the pod handling assembly 116 or in a direction Z' that is along or substantially parallel to the longitudinal axis E. Further, although not illustrated in FIG. 1, the pod handling assembly 116 may include a plurality of components configured to assist in transferring one or more pods 120 from the pod handling assembly 116 to an additional pod handling assembly (not shown) or vice versa. Such components may be substantially similar to and/or the same as the various components of, for example, the first tote handling assembly 102 that will be described in greater detail below with respect to FIGS. 2-4.

The controller 118 disposed at the operator station 110 may comprise any desktop computer, laptop computers, server computer, tablet computers, cellular phone, personal digital assistant, or other computing device configured to control operation of at least one aspect or component of the system 100. In example systems 100, the controller 118 can include one or more devices in a diverse variety of device categories, classes, or types, and the controller 118 is not limited to a particular type of device. In some examples, the controller 118 may comprise a cluster of computing devices and/or a cloud service.

The controller 118 may include any components configured to assist in controlling operation of the tote handling assemblies 102, 104, the pod handling assembly 116, and/or other components of the system 100, as well as performing any other order fulfilment functions. For example, the controller 118 may include can include one or more processing unit(s) operably connected to one or more computer-readable media (e.g., memories), such as via a bus. In some instances, such a bus may include one or more of a system bus, a data bus, an address bus, a Peripheral Component Interconnect (PCI) Express (PCIe) bus, a PCI bus, a Mini-PCI bus, and any variety of local, peripheral, or independent buses, or any combination thereof. While the processing units may reside on the controller 118, in other examples such processing units can also reside on different computing devices separate from and in communication with the controller 118.

The computer-readable media described herein with respect to the controller 118 may include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by the controller 118. In contrast to computer storage media, communication media embodies computer-readable instructions, data structures, program modules, or other data in a modulated data signal, such as a carrier wave, or other transmission mechanism. As defined herein, computer storage media does not include communication media. In some examples, computer-readable media associated with the controller 118 can store instructions executable by the processing unit(s) of the controller 118 to control operation of any of the components of the system 100 and/or to perform any of the other operations described herein. Such computer-readable media can store, for example, computer-executable instructions, an operating system, and/or other computer program instructions.

The one or more processing unit(s) associated with the controller 118 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 114 can be a hybrid device, such as a device from ALTERA or XILINX that includes a CPU core embedded in an FPGA fabric.

In some examples, controller 118 can also include one or more user interface(s) 122 configured to permit an operator 124 to operate one or more components of the controller 118, and to thereby control operation of any of the components of the system 100 described herein. In an example embodiment, a user interface 122 can include one or more input devices or output devices integral or peripheral to the controller 118. Examples of input devices associated with the controller 118 can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like.

Examples of output devices associated with the controller 118 can include a display, a printer, audio speakers, beepers, or other audio output devices, a vibration motor, linear vibrator, or other haptic output device, and the like. For example, the operator station 110 may include a display 126 or other such output device operably connected to the controller 118. In some examples, such a display 126 may be or may include an organic light-emitting-diode (OLED) display, a liquid-crystal display (LCD), a cathode-ray tube (CRT), or another type of visual display. Such a display 126 can be a component of a touchscreen, or can include a touchscreen. In any of the examples described herein, the display 126 may be configured to provide information associated with the pod 120 and/or with one or more items disposed within the pod 120. Such information may include, for example, contents of the pod 120, the mass of the pod 120, the original rack, bin, or other storage location of the pod 120, a manufacturer of the items disposed within the pod 120, an expiration date or a manufacturing date of such items, and/or any other information associated with filling an order using items disposed within the pod 120. The display 126 may also be configured to provide information associate with one or more totes 106 directed to the operator station 110 and/or with individual orders corresponding to each respective tote 106 directed to the operator station 110. Such information may include, for example, a customer name, a shipping address, an order date, a shipping service (e.g., U.S. Postal Service, Federal Express®, United Parcel Service®), and/or an item quantity, and/or other information associated with an order corresponding to a respective tote 106. In example embodiments, the operator 124 may view such information via the display 126, and may transfer one or more items from a pod 120 directed to the operator station 110, to one or more totes 106 directed to the operator station 110, in order to fulfill corresponding orders.

As shown in FIG. 1, in some examples the system 100 may also include at least one imaging device 128. In example embodiments, the imaging device 128 may be in communication with, and/or operably connected to the controller 118 via one or more networks 130. The imaging device 128 may be any device or device component configured to obtain a photograph, digital photo, and/or other image of at least part of the system 100. For example, the imaging device 128 may be positioned and/or otherwise configured to obtain multiple digital images of the first and second tote handling assemblies 102, 104, one or more totes 106 disposed on the tote handling assemblies 102, 104, the pod handling assembly 116, and/or one or more pods 120 disposed on the pod handling assembly 116 during operation of the system 100.

The imaging device 128 may comprise, for example, a digital camera, a wireless phone, a tablet computer, a laptop computer, and/or any other device including photo, video, and/or digital imaging functionality. For example, the imaging device 128 may comprise a digital camera configured to capture video and/or digital images of any object or objects, such as one or more totes 106, disposed within a field of view of the camera. In such examples, the imaging device 128 may include one or more processors configured to execute stored instructions and/or to control operation of the camera in response to one or more inputs received from an operator 124 and/or from the controller 118. The imaging device 128 may also include one or more communication interfaces configured to provide a connection with and facilitate the transfer of data, images, video, files, and/or other information via the network 130 and/or via a wired connection between the controller 118 and the imaging device 128. The imaging device 128 may also include one or more removable and/or non-removable memories. The memory may comprises one or more non-transitory computer-readable storage media that is similar to and/or the same as the memory described above with respect to the controller 118. The memory of the imaging device 128 may be configured to store data, images, video, files, and/or other information captured by the imaging device 128, such as images of one or more totes 106, and/or images of various components of the system 100.

The network 130 may include one or more personal area networks ("PAN"), local area networks ("LAN"), wide area networks ("WAN"), the internet, and so forth. For example, the communications interfaces of the imaging device 128 may include radio modules for a WiFi LAN and a Bluetooth PAN. Such communication interfaces of the imaging device 128 may be in communication with and/or operably connected to similar communication interfaces of the controller 118.

In some examples, the system 100 may also include one or more sensors 132a, 132b (referred to collectively as "sensors 132") in communication with and/or operably connected to the controller 118 via the network 130 and/or via one or more wired connections. Such sensors 132 may comprise, for example, proximity sensors, photo eyes, thermal sensors, mass sensors, infrared sensors, and/or any combination thereof. Such sensors 132 may be configured to determine a proximity, a location, a mass, a temperature, and/or any other characteristic associated with, for example, one or more of the totes 106 and/or with one or more items disposed within the totes 106. In example embodiments, the system 100 may include at least one of an imaging device 128 or a sensor 132 in communication with the controller 118 and configured to determine an orientation of a tote 106 relative to at least one component of the system 100 and/or relative to a fixed reference (e.g., relative to at least one of the longitudinal axes A, C and/or at least one of the transverse axes B, D). For example, at least one of the sensors 132 either alone or in combination with the imaging device 128 may be configured to determine a position, a velocity, an acceleration, an alignment, an orientation, and/or other characteristic of a tote 106 disposed on at least one of the tote handling assemblies 102, 104. In example embodiments, the orientation and/or alignment described herein may comprise an angular orientation and/or an orientation expressed or otherwise determined in Cartesian coordinates. Such an orientation and/or alignment may be determined relative to, for example, at least one of the longitudinal axes A, C and/or at least one of the transverse axes B, D. In such examples, the display 126 may be configured to display and/or otherwise provide information indicative of and/or otherwise associated with the orientation of each respective tote 106.

In some examples, at least one of the sensors 132 and/or the imaging device 128 may be configured to determine, for example, an orientation and/or alignment of a tote 106 relative to at least one of the longitudinal axes A, C and/or at least one of the transverse axes B, D, and the at least one of the sensors 132 and/or the imaging device 128 may generate one or more signals including information indicative of the determined orientation. The at least one of the sensors 132 and/or the imaging device 128 may direct such signals to the controller 118 and, in such examples, the controller 118 may compare the determined orientation with one or more orientation thresholds stored in a memory of the controller 118.

For example, in a hypothetical situation during operation of the system 100, the at least one of the sensors 132 and/or the imaging device 128 may determine that a sidewall of a particular tote 106 is disposed at a particular included angle (e.g., a determined angle of 10 degrees) relative to the transverse axis B of the first tote handling assembly 102. In situations in which an example orientation threshold associated with the transverse axis B has a value that is less than the determined angle (e.g., an orientation threshold having an example value of 8 degrees, or any other value less than 10 degrees), the controller 118 may determine that the orientation of the particular tote 106 is above or otherwise outside of the acceptable orientation threshold. In such examples, the controller 118 may provide an alert, an alarm, and/or other information to an operator via the display 126 and/or other output devices associated with the controller 118 indicating that the determined orientation of the tote 106 is outside of the acceptable orientation threshold. In some examples, the controller 118 may control the first tote handling assembly 102, the second tote handling assembly 104, and/or other components of the system 100 to temporarily halt operation in response to such a determination. Stopping operation in this way may enable the operator 124 to reorient the particular tote 106 such that normal system operation can resume. It is understood that similar determinations and/or operations may be performed based on an orientation and/or orientation threshold associated with any of the axes A, B, C, D, E, tote handling assemblies 102, 104, and/or pod handling assemblies 116 described herein. Further, in additional embodiments, such orientation thresholds may have any value greater than or less than 8 degrees, and the above example should not be interpreted to limit the present disclosure in any way. In any of the example embodiments described herein, at least one of the controller 118, the user interface 122, the display 126, the imaging device 128, and/or the sensors 132 may be a component of at least one of the tote handling assemblies 102, 104.

In additional examples, at least one of the sensors 132 and/or the imaging device 128 may be configured to determine, for example, whether an item has been placed within in one or more of the totes 106, an identity of one or more items disposed within one or more of the particular totes 106, an orientation and/or alignment of such an item within one or more of the totes 106, and/or any other visually, thermally, or otherwise distinguishable characteristic of such items. In such examples, at least one of the sensors 132, the controller 118, and/or the imaging device 128 may employ image recognition software, neural networks, and/or other components to assist in making such determinations. For example, in such embodiments at least one of the sensors 132 and/or the imaging device 128 may scan a tote 106 before an item has been placed in the tote 106, and may generate one or more signals including information indicative of the tote 106 without the item. Once an item has been placed within the tote 106, at least one of the sensors 132 and/or the imaging device 128 may scan the same tote 106 again to determine the presence of the item, the identity of the item, the orientation of the item, etc., and may generate one or more additional signals including information indicative of the tote 106 with the item disposed therein. The at least one of the sensors 132 and/or the imaging device 128 may direct such signals to the controller 118 and, in such examples, the controller 118 may identify the item using image recognition software stored in a memory of the controller 118. In some examples, the imaging device 128 may capture a first image of the tote 106 without the item disposed in the tote 106, and may capture a second image of the tote 106 with the item disposed within the tote 106. The imaging device 128 may send respective signals to the controller 118 including information indicative of such images. The controller 118 may determine the presence of such an item and/or the identity of such an item by, for example, comparing the two images and identifying a change in one or more pixels included in the images based on the comparison.

Figure 2:
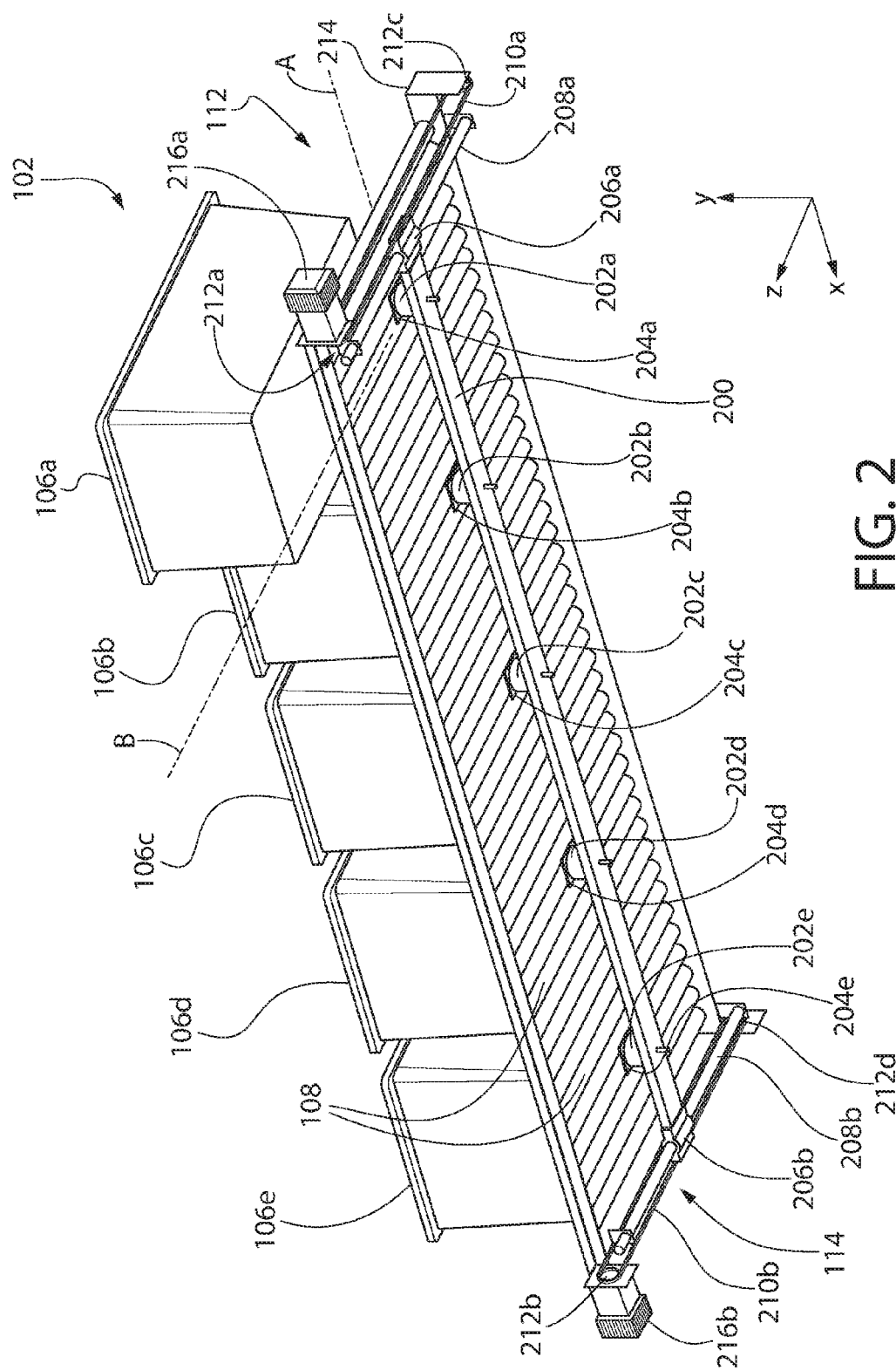
FIG. 2 is a bottom perspective view of an example tote handling assembly and other example components of the system shown in FIG. 1.
Figure 3:
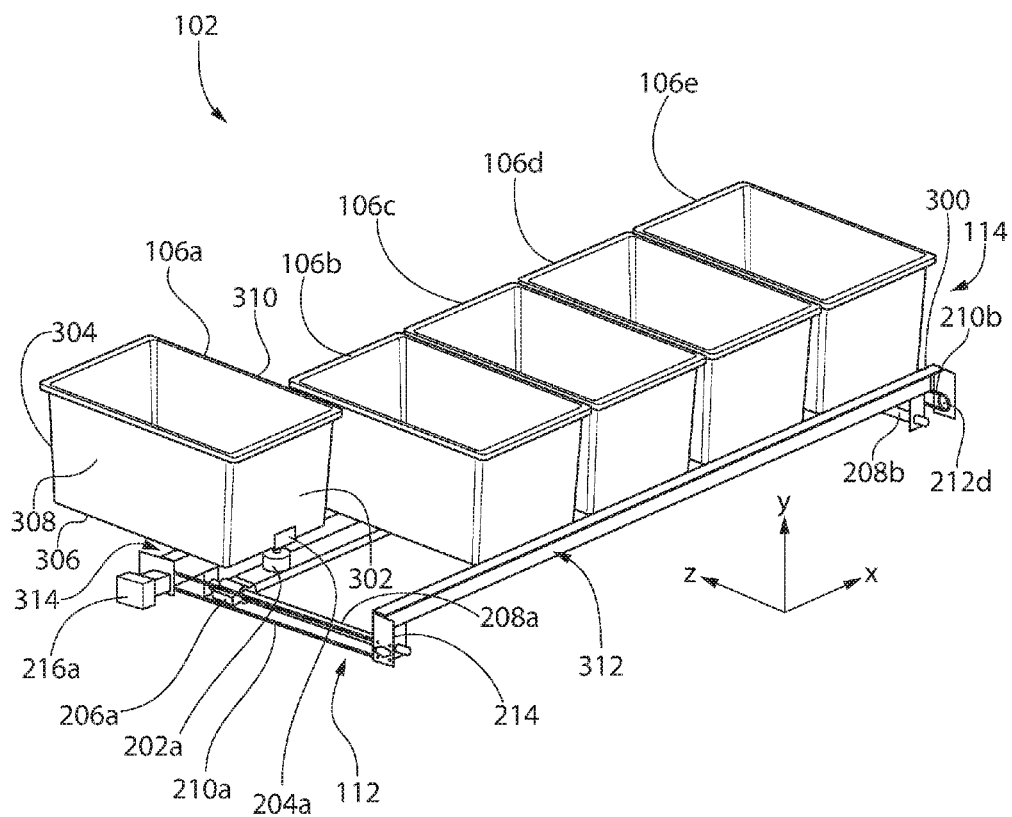
FIG. 3 is a top perspective view of the example tote handling assembly shown in FIG. 2.
Figure 4:
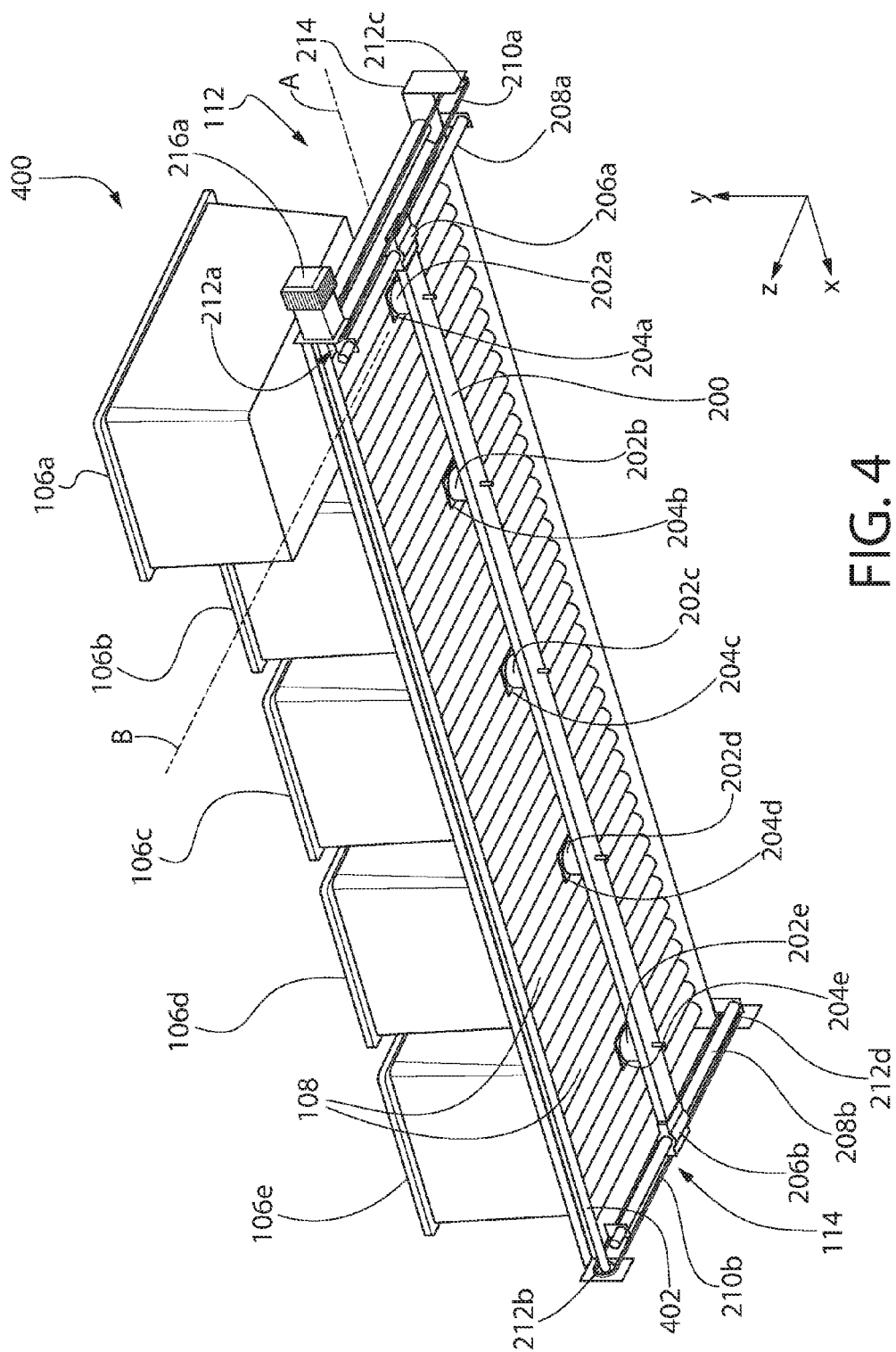
FIG. 4 is a bottom perspective view of another example tote handling assembly of the present disclosure.

FIGS. 2 and 3 illustrate various components of an example tote handling assembly 102, and FIG. 4 illustrates various components of another example tote handling assembly 400. The tote handling assembly 104 described above with respect to FIG. 1 may be substantially similar to and/or the same as either the example tote handling assembly 102 or the tote handling assembly 400 and, in some embodiments, the tote handling assembly 104 described above with respect to FIG. 1 may include substantially similar and/or the same components as either of the tote handling assemblies 102, 400. Accordingly, unless otherwise noted, the descriptions of the tote handling assemblies 102, 400 illustrated in FIGS. 2, 3, and 4 may also be applicable to the tote handling assembly 104.

As shown in FIG. 2, the tote handling assembly 102 may include a wiper bar 200 extending substantially parallel to the longitudinal axis A of the tote handling assembly 102. In such examples, the wiper bar 200 may comprise a substantially planar, substantially rigid, and/or substantially linear rod, bar, shaft, arm, and/or other structure that is configured to move linearly relative to one or more components of the tote handling assembly 102. For example, the wiper bar 200 may extend substantially from the first end 112 of the tote handling assembly 102 to the second end 114. In such examples, the wiper bar 200 may be movable along the transverse axis B of the tote handling assembly 102. In particular, the wiper bar 200 may be movable in the direction Z that is along or substantially parallel to the transverse axis B of the tote handling assembly 102, and in the direction Z' that is along or substantially parallel to the transverse axis B. The wiper bar 200 may have any length, width, and/or other dimension or configuration such that the wiper bar 200 may be configured to move a plurality of totes 106 simultaneously relative to the rollers 108 and/or other components of the tote handling assembly 102. The wiper bar 200 may be made from any metal, alloy, and/or other like material, and may be rigid enough to withstand unbalanced torque forces associated with simultaneously moving one or more totes 106 disposed on the tote handling assembly 102, such as totes 106 at different respective locations on the tote handling assembly 102, without significant levels of flexing or bending. As illustrated in FIG. 2, in some examples, the wiper bar 200 may be disposed beneath the rollers 108 such that the rollers 108 may be disposed between, for example, the wiper bar 200 and one or more totes 106 disposed on the tote handling assembly 102.

The tote handling assembly 102 may also include one or more actuators 202a, 202b, 202c, 202d, 202e . . . 202n (collectively referred to as "actuators 202") connected to and movable with the wiper bar 200. Such actuators 202 may be, for example, solenoids, pneumatic actuators, and/or any other device configured to controllably move a component of the tote handling assembly 102 connected thereto by a finite stroke or other linear distance. Although the tote handling assembly 102 illustrated in FIG. 2 includes five actuators 202, in further examples, the tote handling assembly 102 may include greater than or less than five actuators 202 connected to the wiper bar 200. In such examples, a first actuator 202a may be spaced from a second adjacent actuator 202b, along the length of the wiper bar 200 in the direction X, by any desired distance, and such spacing may correspond to, for example, the length, and/or width dimensions of the totes 106 carried by the tote handling assembly 102. For example, each of the actuators 202 may be disposed along the wiper bar 200 at locations corresponding to approximate positions of the totes 106 when a plurality of totes 106 are disposed substantially adjacent to one another on the rollers 108 of the tote handling assembly 102. In some examples the actuators 202 may be fixedly connected to the wiper bar 200 while in other examples, at least one of the actuators 202 may be moveably connected to the wiper bar 200.

In example embodiments, the tote handling assembly 102 may also include at least one tab 204a, 204b, 204c, 204d, 204e . . . 204n (referred to collectively as "tabs 204"). Each of the tabs 204 may be spaced from one another along the longitudinal axis of A of the tote handling assembly 102. For example, a first tab 204a may be spaced from a second adjacent tab 204b along the longitudinal axis A, and so on. In some examples, the two or more adjacent tabs 204 may be spaced from one another along, for example, the wiper bar 200. For instance, in some examples, at least one of the tabs 204a may be connected to a respective actuator 202a, and such a tab 204a may be spaced from an adjacent tab 204b along the wiper bar 200 regardless of the manner in which the adjacent tab 204b is connected to and/or otherwise associated with the wiper bar 200. In such examples, the adjacent tab 204b may be directly connected to the wiper bar 200, or may be indirectly connected to the wiper bar 200 via one or more rods, shafts, arms, or other linkages (not shown). In additional examples, each tab 204 may be connected to a respective actuator 202 at spaced locations along the wiper bar 200. In such examples, one or more of the tabs 204 may be directly connected to a respective actuator 202, as shown in FIG. 2. Alternatively, in some examples, one or more of the tabs 204 may be indirectly connected and/or otherwise coupled to a respective actuator 202 via one or more rods, shafts, arms, or other linkages (not shown).

In any of the example embodiments described herein, each of the actuators 202 may be configured to move a corresponding tab 204 connected thereto, either directly or indirectly, in a direction Y and in a direction Y'. Such directions may be, for example, substantially perpendicular to a plane of the tote handling assembly 102 that includes the longitudinal axis A and the transverse axis B. Additionally, the movement of such tabs 204 may correspond to a stroke of the corresponding actuator 202. For example, each actuator 202 may have a finite stroke or displacement in the direction Y, and upon activation, the actuators 202 may move the tab 204 connected thereto a distance substantially equal to such a stroke.

The example tabs 204 of the present disclosure may have any shape, size, orientation, or other configuration configured to assist in engaging with a tote 106 disposed on the tote handling assembly 102. For example, each tab 204 may one or more prongs, fingers, extensions, and/or other like components configured to engage the surface of the tote 106. Engaging the tote 106 in this way may assist the tab 204 in moving the tote 106, for example, the direction Z that is along or substantially parallel to the transverse axis B of the tote handling assembly 102. For instance, while the actuators 202 are disengaged, the tab 204 may remain substantially below a top surface of the rollers 108 such that the tab 204 may not contact a corresponding tote 106 disposed on the tote handling assembly 102. Engaging one of the actuators 202, however, may move a tab 204 connected to the actuator 202 vertically in the direction Y such that the tab 204 may engage the tote 106. For example, the plurality of rollers 108 include a first roller and a second roller disposed substantially adjacent to the first roller. In such examples, the second roller may be spaced from the first roller in the direction X by a gap. Accordingly, when the actuator 202 is engaged to move the tab 204 vertically in the direction Y, the tab 204 may extend at least partly into the gap to engage the tote 106. For example, one or more of the prongs, fingers, extensions, and/or other components of the tab 204 may extend at least partly into the gap while the tab 204 is engaged with the tote 106.

As noted above, the actuators 202 may be disposed at fixed locations along the length of the wiper bar 200, and the actuators 202 may be spaced, in the direction X, such that a respective tab 204 connected to each actuator 202 is positioned to engage a respective tote 106 of a plurality of totes 106 disposed on the tote handling assembly 102. Accordingly, movement of the wiper bar 200 in the direction Z that is along or substantially parallel to the transverse axis B of the tote handling assembly 102, while the tab 204 is engaged with a tote 106, may move the tote 106 in the direction Z that is along or substantially parallel to the transverse axis B. Likewise, in embodiments in which the system 100 includes first and second tote handling assemblies 102, 104, it is understood that movement of a wiper bar 200 of the second tote handling assembly 104 in the direction Z', while a tab 204 of the second tote handling assembly 104 is engaged with a tote 106 disposed on the second tote handling assembly 104, may move the tote 106 in the direction Z'. In any of the example embodiments described herein, the one or more actuators 202 of the tote handling assembly 102 may be operably and/or otherwise connected to the controller 118 (FIG. 1), and the controller 118 may be configured activate and deactivate each of the actuators 202 independently.

As shown in FIG. 2, the tote handling assembly 102 may also include one or more components, such as one or more sleeves 206a, 206b (referred to collectively as "sleeves 206"), guide rods 208a, 208b (referred to collectively as "guide rods 208"), linkages 210a, 210b (referred to collectively as "linkages 210"), fittings 212a, 212b, 212c, 212d (referred to collectively as "fittings 212"), and/or other components configured to facilitate moving the wiper bar 200 in the directions Z, Z' along or substantially parallel to the transverse axis B of the tote handling assembly 102. As will be described below, such components may be directly or indirectly connected to and/or supported by a frame 214 of the tote handling assembly 102, and in some embodiments, such components may include one or more additional actuators 216a, 216b (referred to collectively as "actuators 216") configured to move the wiper bar 200 in the directions Z, Z' along or substantially parallel to the transverse axis B.

The frame 214 may comprise any substantially rigid structure or combination of structures configured to support the various components of the tote handling assembly 102, and to support a plurality of totes 106, carried by the tote handling assembly 102. In some examples, the frame 214 may include any number of rails, linkages, truss structures, supports, or other like structures configured to add rigidity, and/or strength to the frame 214. In such examples, the frame 214 may have any shape, size, length, width, height, and/or other configuration configured to assist in supporting the various components of the tote handling assembly 102. For example, while the frame 214 illustrated in FIG. 2 may have a substantially rectangular shape, in other examples frame 214 may be substantially square, substantially rounded, curve, trapezoidal, and/or any other shape configured to assist in directing a plurality of totes 106 to the operator station 110 (FIG. 1). The frame 214 may be made from steel, aluminum, and/or any other any metal or alloy, and in some examples, the frame 214 may include one or more flanges, brackets, shelves, platforms, and/or other surfaces are structures to which any of the components described herein with respect to the tote handling assemblies 102, 104, 400 and/or the pod handling assembly 116 may be mounted. Further, any of the axes A, B, C, D, E described herein and/or any of the planes defined by such axes defined by one or more structures or portions of the frame 214.

In any of the examples described herein, the wiper bar 200 may be supported by the frame 214, and may be moveable in the directions Z, Z' along or substantially parallel to the transverse axis B relative to the frame 214. For example, the sleeves 206a, 206b may be connected to the wiper bar 200 at opposite ends of the wiper bar 200, and the sleeves 206 may moveably connect the wiper bar 200 to the guide rods 208. For example, each sleeve 206 may include an opening, a channel, and/or a passage having a shape, diameter, and/or other configuration to accept a corresponding guide rod 208. In some examples, the guide rod 208 may comprise a substantially cylindrical shaft extending along substantially an entire width or length of the frame 214 in the direction Z. In such examples, the sleeves 206 may include a substantially cylindrical passage configured to accept the guide rods 208, and to movably connect the wiper bar 200 to the guide rod 208. As shown in FIG. 2, in some examples the guide rod 208a may be disposed at the first end 112 of the frame 214, and the guide rod 208b may be disposed substantially parallel to the guide rod 208b at the second end of the frame 214. In such examples, the guide rods 208 may be disposed substantially parallel to the transverse axis B and/or substantially parallel to one or more rollers 108 of the tote handling assembly 102 connected to the frame 214. In such examples, the sleeves 206 may be configured to ride along and/or be otherwise supported by an outer diameter of the guide rods 208 as the wiper bar 200 moves in the directions Z, Z' described above. To facilitate such movement, in some examples the sleeves 206 may include one or more bushings, bearings, follower surfaces, and/or other components figured to minimize resistance, friction, and/or other person loads associated with moving the wiper bar 200 while the sleeves 206 are connected to the guide rods 208. Further, although the guide rods 208 are illustrated in FIG. 2 as having a substantially cylindrical shape, in other embodiments, one or more of the guide rods 208 may have a cross-section that is substantially square, substantially L-shaped, substantially rectangular, substantially oval, and/or any other shape. Further, it is understood that the guide rods 208 may be fixedly connected to the frame 214, via one or more flanges, brackets, surfaces, and/or other components of the frame 214.

At least one of the actuators 216 may also be connected to the frame 214, via one or more flanges, brackets, surfaces, and/or other components. In some examples, such actuators 216 may comprise, for example, any servo motor, AC motor, DC motor, stepper motor, and/or other motor, pneumatic device, and/or other device having an output shaft configured to rotate in a desired direction (e.g., clockwise or counterclockwise) at a desired fixed speed and/or at a desired variable speed. Such actuators 216 may comprise, for example, any electric motor or other motor known in the art. In the example embodiment of FIG. 2, the actuator 216a may be connected to the frame 214 at the first end 112, and the actuator 216b may be connected to the frame 214 at the second end 114, and in any of the examples described herein, the one or more actuators 216 of the tote handling assembly 102 may be operably and/or otherwise connected to the controller 118 (FIG. 1), and the controller 118 may be configured activate and deactivate each of the actuators 216 independently or in combination. For example, in embodiments in which the tote handling assembly 102 includes two actuators 216, the controller 118 may control operation of the actuators 216 in accordance with any common master-slave drive relationship. In such a control architecture, the controller 118 may control the respective output shafts of the actuators 216 to rotate at substantially the same speeds and/or in the same or opposite directions to facilitate movement of the wiper bar 200, for example, the in the directions Z, Z'.

For example, the controller 118 may control the speed, acceleration, deceleration, starting time, stopping time, and/or direction at which the respective output shafts of the actuators 216 rotate during operation of the tote handling assembly 102, and as a result, the one or more actuators 216 may be operable to move the wiper bar 200, along the first and second guide rods 208 in the directions Z, Z'. Thus, in embodiments in which the tote handling assembly 102 includes two actuators 216 (e.g., a first motor 216a disposed at the first end 112 of the frame 214 and a second motor 216b disposed at the second end 114) operably and/or otherwise connected to the wiper bar 200, such as via one or more linkages 210, the controller 118 may control operation of the actuators 216 such that the first actuator 216a may be operable to move the wiper bar 200 in the directions Z, Z' in combination and/or otherwise in concert with the second actuator 216b.

In any of the examples described herein, the linkage 210a may connect the actuator 216a to the wiper bar 200 at the first end 112 of the frame 214, and the linkage 210b may connect the actuator 216b to the wiper bar 200 at the second 114 of the frame 214. As shown in FIG. 2, in some examples the linkages 210 may comprise one or more belts, chains, shafts, tracks, and/or other movable linkage devices configured to translate torque and/or rotational force provided by the respective output shafts of the actuators 216 to the wiper bar 200. In this way, the linkages 210 may cause substantially linear motion of the wiper bar 200 along the guide rods 208 in response to rotation of the respective output shafts of the actuators 216. In any of the examples described herein, the wiper bar 200 may be fixedly connected to the linkages 210, and the linkages 210 may be movably connected to the frame 214 such that activation of one or more actuators 216 may move the linkages 210 relative to the frame 214. As a result of the fixed connection between the wiper bar 200 and the linkages 210, such movement of the linkages 210 relative to the frame 214 may cause corresponding movement of the wiper bar 200 relative to the frame 214 in the directions Z, Z'.

For example, the sleeve 206a may be bolted, clamped, welded, crimped, mesh, and/or otherwise fixedly connected to the linkage 210a at the first end 112 of the frame 214, and the sleeve 206b may be fixedly connected to the linkage 210b at the second end 114 of the frame 214 in a similar manner. In such embodiments, an output shaft of the one or more actuators 216 may mate with a corresponding linkage 210 such that rotation of the output shaft may drive and/or otherwise cause corresponding rotation and/or other movement of the respective linkage 210 relative to the frame 214.

In some examples, the linkages, 210 may be direct contact with the output shafts of the respective actuators 216, while in other examples, one or more gears, pulleys, bearings, bushings, and/or other fittings structures may be employed to mate an output shaft of an actuator 216 with a respective linkage 210. Additionally, one or more such fittings 212 may be rotatably mounted to the frame 214, and may be configured to facilitate movement of the linkages 210 relative to the frame 214. For example, each linkage 210 may mate with a pair of fittings 212 disposed at each end 112, 114 of the frame 214, and each pair of fittings 212 may facilitate rotation of the corresponding linkage 210 relative to the frame 214 as the linkage 210 is driven by a corresponding actuator 216 of the tote handling assembly 102.

FIG. 3 illustrates another view (e.g., a top isometric view) of the tote handling assembly 102. In the example embodiment shown in FIG. 3, the rollers 108 (FIG. 2) rotatably connected to the frame 214 have been omitted for clarity. As shown in FIG. 3, the frame 214 may include one or more rails, such as a rail 300 disposed along a back edge, and/or portion of the frame 214. Such a rail 300 may assist in guiding movement of the totes 106 as the totes 106 move along the tote handling assembly 102 in the directions X, X'. Such a rail 300 may extend along substantially an entire length of the frame 214, such as from the first end 112 to the second end 114. In other examples, the frame 214 may include one or more additional rails 300, and such additional rails 300 may be disposed along substantially an entire width of the frame 214 (e.g., proximate the first or second end 112, 114), along a front edge of the frame 214, and/or at any other desired location along the frame 214 to assist in guiding movement of the totes 106 during operation of the tote handling assembly 102.

FIG. 3 also illustrates the example movable connection between the sleeve 206a, and the guide rod 208a at the first end 114 of the frame 214, as well as the example fixed connection between the sleeve 206a and the linkage 210a. Further, FIG. 3 illustrates an example engagement between the tab 204a and a first tote 106a. As shown in FIG. 3, the tab 204a, may comprise one or more prongs, fingers, extensions, and/or other like components configured to engage a surface of the tote 106a. In particular, the tabs 204 described herein may contact respective exterior surfaces of a back wall 302, a front wall 304 disposed opposite the back wall 302, a base 306 and/or one or more side walls 308, 310 of a tote 106 substantially perpendicular to one or both of the walls 302, 304. Engaging a tote 106 in this way may assist the tab 204 in moving the tote 106, for example, the direction Z relative to the frame 214.

For instance, as illustrated in FIG. 3, while the actuator 202a is activated, the tab 204a connected to the actuator 202a may be moved vertically in the direction Y such that the tab 204a may engage the back wall 302 and/or the base 306 of the tote 106a. Accordingly, movement of the wiper bar 200 in the direction Z, while the tab 204a is engaged with the tote 106a, may move the tote 106a in the direction Z. In particular, while engaged with at least the back wall 302 of the tote 106a, the tab 204a may be configured to apply a force to the back wall 302 in the direction Z as the wiper bar 200 is moved in the direction Z. Such a force may effectively push the tote 106a along an outer surface of one or more of the substantially cylindrical rollers 108 (not shown) in the direction Z. Movement of the tote 106a may be more effective and more accurate than, for example, other methods of moving totes 106 in which contact is only made between rollers 108 and/or other components of the tote handling assembly and the outer surface of the base 306. In particular, such methods may rely on gravity and friction to move the tote, without the direct force applied by the example tabs 204 of the present disclosure. While FIG. 3 illustrates the tab 204a mating with the tote 106a to move the tote in the Z direction, it is understood that the tote assemblies 102, 104 described herein may be configured to move one or more items other than totes. For example, in other embodiments, one or more items other than totes 106, such as inventory items configured to be disposed within the totes 106 or pods 120 described herein, may be disposed on the rollers 108 directly, and may be acted on by, for example, the tabs 204. In such examples, the tabs 204 may engage at least a portion of such items, and may be configured to apply a force to such items in the direction Z as the wiper bar 200 is moved in the direction Z. Additionally, the rollers 108 may be configured to move such items in the directions X, X' by applying a force directly to such items.

As noted above, FIG. 3 illustrates an example embodiment in which the tab 204a engaged with the back wall 302 of the tote 106a. In such embodiments, the tote 106a may be disposed at an initial position in which the back wall 302 is proximate and/or substantially adjacent to the rail 300 (as with the positions of totes 106b-106e illustrated in FIG. 3). The wiper bar 200 may also be disposed at an initial position proximate and/or substantially adjacent to a back 312 of the frame 214, such as proximate the rail 300. As a result, when the actuator 202a is activated to move the tab 204a vertically in the direction Y, the tab 204a may be positioned to engage at least the back wall 302 of the tote 106a, and to apply a force to the back wall 302 in the direction Z as the wiper bar 200 is moved in the direction Z. In other example embodiments, on the other hand, the tab 204a may be configured to engage the front wall 304 of the tote 106a. In such embodiments, the tote 106a may be disposed at the initial position described above in which the back wall 302 is proximate and/or substantially adjacent to the rail 300. The wiper bar 200 may, however, be disposed at an initial position proximate and/or substantially adjacent to a front 314 of the frame 214 opposite the back 312. As a result, when the actuator 202a is activated to move the tab 204a vertically in the direction Y, the tab 204a may be positioned to engage at least the front wall 304 of the tote 106a, and to apply a force to the front wall 304 in the direction Z' as the wiper bar 200 is moved in the direction Z' from the front 314 of the frame 214 to the back 312. Such a configuration may be employed, for example, by the second tote handling assembly 104 (FIG. 1) in order to transfer the tote 106a from the second tote handling assembly 104 to the first tote handling assembly 102.

In still further examples, one or more of the tabs 204 described herein may be rotatable, pivotable, and/or otherwise moveable relative to the totes 106, the actuators 202, the frame 214, the wiper bar 200, the rollers 108, and/or other components of the tote handling assembly 102. For example, in some embodiments in which the position and/or orientation of the tabs 204 are fixed relative to the actuators 202 and/or the wiper bar 200, the tabs 204 may be operable to either engage at least the back wall 302 of a respective tote 106 and to apply a force to the back wall 302 in the direction Z as the wiper bar 200 is moved in the direction Z, or to engage at least the front wall 304 of the respective tote 106 and to apply a force to the front wall 304 in the direction Z' as the wiper bar 200 is moved in the direction Z'. In examples in which a tab 204 is rotatable at least approximately 108 degrees in the clockwise and/or counterclockwise direction about an axis extending substantially parallel to the direction Y, such as a longitudinal axis of a shaft or other component of a corresponding actuator 202, the tab 204 may be configured to engage either the front wall 304 or the back wall 302 of the tote 106 depending on the orientation of the tab 204 about such an axis and on the initial position of the wiper bar 200. Such functionality may enable a single tote handling assembly 102 to apply a force to the tote 106 in either of the directions Z, Z' and, as a result, may enable such a tote handling assembly 102 to move the tote 106 in either of the directions Z, Z' during operation.

It is understood that one or more servo motors, electric motors, solenoids, pneumatic actuators, and/or other such devices may be connected to the tabs 204 and/or to the actuators 202 to facilitate such rotation of the tabs 204. In still further examples, such devices may be connected to the wiper bar 200, and such devices may rotate the actuator s 202 and the corresponding tabs 204 relative to the wiper bar 200 to facilitate such functionality. In any of the examples described herein, such devices may be operably and/or otherwise connected to the controller 118 (FIG. 1), and the controller 118 may be configured activate and deactivate each of the devices independently.

FIG. 4 illustrates a further example tote handling assembly 400 of the present disclosure. The example tote handling assembly 400 of FIG. 4 may be substantially the same as the example tote handling assemblies 102, 104 described herein and/or substantially the same as the example pod handling assemblies 116. Accordingly, as identified using like item numerals in FIG. 4, the tote handling assembly 400 may have substantially similar and/or the same components as at least one of the tote handling assemblies 102, 104 and/or the pod handling assemblies 116. Accordingly, unless otherwise noted, the descriptions of the tote handling assemblies 102, 104 and/or the pod handling assemblies 116 illustrated in FIGS. 1, 2, and 3 may also be applicable to the tote handling assembly 400 shown in FIG. 4.

As shown in FIG. 4, the example tote handling assembly 400 may include, among other things, a wiper bar 200 extending substantially parallel to the longitudinal axis A of the tote handling assembly 400. In such examples, the wiper bar 200 may be disposed beneath a plurality of rollers 108, and may be movable along the transverse axis B of the tote handling assembly 400. In particular, the wiper bar 200 may be movable in the direction Z that is along or substantially parallel to the transverse axis B of the tote handling assembly 400 and in the direction Z' that is along or substantially parallel to the transverse axis B. The tote handling assembly 400 may also include one or more actuators 202 connected to and movable with the wiper bar 200, and at least one tab 204 connected to each respective actuator 202. In such embodiments, each of the actuators 202 may be configured to move a corresponding tab 204 connected thereto in a direction Y and in a direction Y'. In addition, the tote handling assembly 400 may include one or more components, such as one or more sleeves 206, guide rods 208, linkages 210, fittings 212, and/or other components configured to facilitate moving the wiper bar 200 in the directions Z, Z' along or substantially parallel to the transverse axis B of the tote handling assembly 400. Such components may be directly or indirectly connected to and/or supported by a frame 214 of the tote handling assembly 400, and in some embodiments, such components may include an actuator 216a configured to move the wiper bar 200 in the directions Z, Z' along or substantially parallel to the transverse axis B. Moreover, such components may be substantially similar to and/or the same as the corresponding components described above with respect to at least FIGS. 2 and 3.

In the example embodiment of FIG. 4, however, the second actuator 216b discussed above with respect to FIG. 2 may be omitted. Instead, a single actuator 216a, such as a servo motor, an electric motor, and/or any of the devices described above with the actuators 216 of FIG. 2 may be employed by the tote handling assembly 400 to drive movement of the wiper bar 200 relative to the frame 214. Omitting the second actuator 216b from the embodiment shown in FIG. 4 may further reduce the overall cost of the tote handling assembly 400 with respect to known systems, and may reduce the cost of the tote handling assembly 400 relative to the other tote handling assemblies 102, 104 described herein.

In such an example embodiment, the single actuator 216a may be connected to linkage 210a as described above with respect to FIG. 2. Additionally, the tote handling assembly 400 may include one or more synchronous belts, chains, tracks, shafts, rods, and/or other linkages 402 extending from the first end 112 to the second end 114. Such a linkage 402 may mate with, for example, the actuator 216a, the linkage 210a, and/or the fitting 212a to drive motion of the linkage 210b disposed at the second end 214. In such examples, one or more additional gears, pulleys, clamps, brackets, bushings, and/or other such fittings may be provided at the intersection of the linkage 402 and, for example the linkages 210a, 210b to facilitate a mating relationship between such linkages 210a, 210b, and the linkage 402. Due to the connection between the linkages 210a, 210b, 402 described herein, rotation of the output shaft of the single actuator 216a may drive movement of the linkage 210b relative to the frame 214. In particular, torque and/or rotational force provided by the output shaft of the actuator 216a may drive rotation and/or other movement of the linkage 210a relative to the frame 214. Such movement may be, for example, about the fittings 212a, 212c. Additionally, the linkage 402 connecting the linkages 210a, 210b may be configured to translate torque and/or rotational force from the output shaft of the actuator 216a, and/or from commensurate movement of the fitting 212a and/or the linkage 210a, to the linkage 210b. In this way, the linkage 410 may drive movement of the linkage 210b in concert with the movement of the linkage 210a. Thus, due to the connection between the linkages 210a, 210b, 402 described herein, rotation of the output shaft of the single actuator 216a shown in FIG. 4 may drive movement of the wiper bar 200 connected to the linkages 201a, 210b in the directions Z, Z'.

As noted above, in any of the example systems 100 described herein, various tote handling assemblies 102, 104 may be utilized to move one or more totes 106 to a location proximate a user station 110. For example, the various wiper bars 200, rollers 108, actuators 202, actuators 216, and/or other components of the respective tote handling assemblies 102, 104 may be configured to provide one or more totes 106 to the location proximate the user station 110 in any desired order and at any desired arrival time. The sequential order, arrival time, and/or other characteristics of the totes 106, directed toward the user station 110 may correspond to, for example, one or more orders to be filled at the operator station 110 using items delivered to the operator station 110 in one or more pods 116. In some examples, providing one or more totes 106 to a location proximate the user station 110 in a desired order and/or at any desired arrival time may enable an operator 124 to remove a required quantity of items from an arriving pod 120 and dispose the removed items within each of the totes 106 in an efficient and reliable manner.

In order to facilitate such order fulfillment operations, the controller 118 may control an actuator 202a to move a tab 204a connected to the actuator 202a in the direction Y that is substantially perpendicular to a plane formed by the longitudinal and transverse axes A, B of the first tote handling assembly 102. It is understood that the direction Y may be vertically upward relative to, for example, the rollers 108 and/or various other components of the first tote handling assembly 102 on which one or more totes 106 may be disposed. Additionally, moving the tab 204a in the direction Y may cause the tab 204a to contact and/or otherwise engage the base 306 and/or the back wall 302 of a particular tote 106a disposed on the first tote handling assembly 102. In some examples, moving the tab 204a in the direction Y to engage the base 306 and/or the back wall 302 may cause one or more prongs, fingers, extensions, and/or other components of the tab 204a to extend at least partly into a gap between adjacent rollers 108 of the first tote handling assembly 102. In such examples, the one or more prongs, fingers, extensions, and/or other components of the tab 204a may extend into the gap so as to contact at least the back wall 302 of the tote 106a. Further, in such examples, the wiper bar 200 may be disposed at an initial position substantially adjacent and/or proximate the back 312 of the frame 214, such as proximate the rail 300. Moreover, in such examples, the tote 106a may be in the initial position shown in FIG. 1. When the tote 106a is in such an initial position, the tote 106a may be disposed, for example, substantially adjacent and/or proximate the back 312 of the frame 214, such as proximate the rail 300.

In such examples, the controller 118 may also control at least one of the actuators 216 described herein to move the wiper bar 200, in the direction Z that is along and/or substantially parallel to the transverse axis B, while the tab 204a is engaged with the tote 106a. Such movement of the wiper bar 200 may cause the tab 204a to apply a force to the back wall 302 of the tote 106a in the direction Z. It is understood that such a force may be imparted to the back wall 302, via the tab 204a, by virtue of the tab 204a being driven in the direction Z as the wiper bar 200 moves in the same direction. Further, in example embodiments in which the second tote handling assembly 104 is disposed adjacent to the first tote handling assembly 102, moving the wiper bar 200 in the direction Z while the tab 204a is engaged with the tote 106a may transfer the tote 106a from the first tote handling assembly 102 to the second tote handling assembly 104. In particular, such movement may transfer the tote 106a from a first location on the tote handling assembly 102 in which the tote 106a is supported by the rollers 108 of the tote handling assembly 102, to a second location on the tote handling assembly 104 in which the tote 106a is supported by the rollers 108 of the second tote handling assembly 104.

In such an example, the controller 118 may also control one or more rollers 108 of the second tote handling assembly 104 to rotate in either the clockwise or the counterclockwise direction with respect to the frame 214 of the second tote handling assembly 104. Rotating the rollers 108 of the second tote handling assembly 104 supporting the tote 106a in this way may move the tote 106a in the direction X that is along and/or substantially parallel to the longitudinal axis C of the second tote handling assembly 104. As can be seen from the example system 100 shown in FIG. 1, moving the tote 106a in this way may move the tote 106a toward the operator station 110 proximate the end 114 of the second tote handling assembly 104.

In further examples, it may also be desirable or necessary to at least temporarily transfer the tote 106a from the second tote handling assembly 104 to the first tote handling assembly 102. Transferring the tote 106a from the second tote handling assembly 104 to the first tote handling assembly 102 may allow, for example, another tote 106b to be positioned closer to the operator station 110 than the tote 106a. Such re-sequencing of the various totes 106 described herein may be required based on a number of factors including the sequence and/or requirements of the various orders being fulfilled at the operator station 110, the timing of arrival of various pods 120 at the operator station 110, and/or other order fulfilment factors.

In such further examples, in order to transfer the tote 106a from the second tote handling assembly 104 to the first tote handling assembly 102, the controller 118 may control an actuator 202c fixedly connected to a wiper bar 200 of the second tote handling assembly 104 to move a tab 204c, connected to the actuator 202c, in the direction Y. In such examples, the direction Y may be substantially perpendicular to a plane formed by the longitudinal and transverse axes C, D of the second tote handling assembly 104. It is understood that such a direction Y may also be vertically upward relative to, for example, the rollers 108 and/or various other components of the second tote handling assembly 104. Moving the tab 204c in the direction Y may cause the tab 204c to contact and/or otherwise engage the base 306 and/or the front wall 304 of the tote 106a. In some examples, one or more prongs, fingers, extensions, and/or other components of the tab 204c may extend into a gap separating adjacent rollers 108 of the second tote handling assembly 104 so as to contact at least the front wall 304 of the tote 106a. Further, in such examples, the wiper bar 200 of the second tote handling assembly 104 may be disposed at an initial position substantially adjacent and/or proximate the front 314 of the frame 214, such as proximate a front rail of the frame 214. Moreover, in such examples, the tote 106a may be in an initial position proximate the front 314 of the frame 214, such as proximate a front rail of the frame 214. When the tote 106a is in such an initial position, the tote 106a may be disposed, for example, in the position of either of the totes 106c, 106d illustrated in FIG. 1.

In such examples, the controller 118 may also control at least one of the actuators 216 described herein to move the wiper bar 200 of the second tote handling assembly 104, in the direction Z' that is along and/or substantially parallel to the transverse axis D, while the tab 204c is engaged with at least the front wall 304 of the tote 106a. Such movement of the wiper bar 200 may cause the tab 204c to apply a force to the front wall 304 of the tote 106a in the direction Z'. It is understood that such a force may be imparted to the front wall 304, via the tab 204c, by virtue of the tab 204c being driven in the direction Z' as the wiper bar 200 of the second tote handling assembly 104 moves in the direction Z' toward the first tote handling assembly 102. Further, in example embodiments in which the second tote handling assembly 104 is disposed adjacent to the first tote handling assembly 102, moving the wiper bar 200 in the direction Z' while the tab 204c is engaged with the front wall 304 of the tote 106a may transfer the tote 106a from the second tote handling assembly 104 to the first tote handling assembly 102.

Additionally, in order to allow another tote 106b to be positioned closer to the operator station 110 than the tote 106a, the controller 118 may also control the actuator 202b connected to the wiper bar 200 of the first tote handling assembly 102 to move the tab 204b connected to the actuator 202b in the direction Y. In such examples, moving the tab 204b in the direction Y may cause the tab 204b to contact and/or otherwise engage the base 306 and/or the back wall 302 of an additional tote 106b disposed on the first tote handling assembly 102. In such examples, one or more prongs, fingers, extensions, and/or other components of the tab 204b may extend into a gap separating adjacent rollers 108 of the first tote handling assembly 102 to contact at least the back wall 302 of the tote 106b. Further, in such examples, the wiper bar 200 may be disposed at the initial position described above substantially adjacent and/or proximate the back 312 of the frame 214. Moreover, in such examples, the tote 106b may be in the initial position shown in FIG. 1.

In such examples, the controller 118 may also control at least one of the motors or other actuators 216 of the first tote handling assembly 102 to move the wiper bar 200 of the first tote handling assembly 102 in the direction Z while the tab 204b is engaged with the tote 106b. Such movement of the wiper bar 200 may cause the tab 204b to apply a force to the back wall 302 of the tote 106b in the direction Z. Moving the wiper bar 200 of the first tote handling assembly 102 in the direction Z while the tab 204b is engaged with the tote 106b may transfer the tote 106b from the first tote handling assembly 102 to the second tote handling assembly 104.

In such an example, the controller 118 may also control one or more rollers 108 of the second tote handling assembly 104 to rotate in either the clockwise or the counterclockwise direction with respect to the frame 214 of the second tote handling assembly 104. Rotating the rollers 108 of the second tote handling assembly 104 supporting the tote 106b in this way may move the tote 106b in the direction X that is along and/or substantially parallel to the longitudinal axis C of the second tote handling assembly 104. Moving the tote 106b in this way may move the tote 106b toward the operator station 110 proximate the end 114 of the second tote handling assembly 104.

As noted above, example systems 100 of the present disclosure include a first tote handling assembly 102 and a second tote handling assembly 104 located substantially adjacent to and substantially parallel to the first tote handling assembly 102. The tote handling assemblies 102, 104 of the present disclosure may include a wiper bar 200, and one or more actuators 202 connected to and moveable with the wiper bar 200. Additionally, a respective tab 204 may be connected to each actuator 202, and each actuator 202 may be configured to move the corresponding tab 204 in a vertical direction to engage a tote disposed on the respective tote handling assembly. The wiper bar 200 may be moveable along a transverse axis of the tote handling assembly, or in a direction that is substantially parallel to the transverse axis, such that movement of the wiper bar 200 while a tab 204 is engaged with a tote 106 may transfer the tote 106 from the first tote handling assembly 102 to the second tote handling assembly 104.

Since the tote handling assemblies 102, 104 of the present disclosure use servo motors, solenoids, and/or other like actuators to drive motion of, for example, the wiper bar 200, the tabs 204, and/or other tote handling assembly components described herein, the overall cost of such tote handling assemblies may be significantly less than the cost of known material handling systems employing right-angle transfer devices or other complex components. Additionally, the various components included in the example systems 100 of the present disclosure may reduce the time and complexity associated with manufacturing and/or assembling such systems 100 relative to known material handling systems.

Accordingly, the example systems and methods of the present disclosure offer unique and heretofore unworkable approaches to handling totes in order fulfillment environments. Such systems and methods reduce the costs associated with order fulfillment and improve operator efficiency.

CONCLUSION

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A system, comprising:
a wiper bar that is elongate along a first axis, the wiper bar being moveable along a second axis, the second axis being perpendicular to the first axis,
a plurality of actuators coupled to and moveable with the wiper bar, and
a plurality of tabs, each tab of the plurality of tabs coupled to a respective actuator of the plurality of actuators,
a first actuator of the first plurality of actuators configured to move a first tab of the first plurality of tabs in a direction away from a plane defined by the first axis and the second axis, and
a second actuator of the first plurality of actuators configured to move a second tab of the first plurality of tabs in the direction, the second actuator being configured to move the second tab independent from movement of the first tab.

2. The system of claim 1, further comprising a plurality of rollers configured to support an item as it travels along the first axis.

3. The system of claim 1, wherein the wiper bar is a first wiper bar, the plurality of actuators is a first plurality of actuators, and the plurality of tabs is a first plurality of tabs, and the first wiper bar, the first plurality of actuators, and the first plurality of tabs comprise a first assembly, the system further comprising:
a second assembly disposed proximate to the first assembly, the second assembly including
a second wiper bar that is elongate along a third axis, the second wiper bar being moveable along a fourth axis, the fourth axis being perpendicular to the third axis,
a second plurality of actuators coupled to and moveable with the second wiper bar, and
a second plurality of tabs, each tab of the second plurality of tabs coupled to a respective actuator of the second plurality of actuators,
the first wiper bar configured to transfer an item from the first assembly to the second assembly, and
the second wiper bar configured to transfer the item from the second assembly to the first assembly.

4. The system of claim 3, wherein the item is disposed in a container and the system further comprises a third assembly configured to direct the container to a location proximate at least one of the first assembly and the second assembly.

5. The system of claim 1, further comprising:
a controller; and
at least one of an imaging device and a sensor coupled to the controller,
the at least one of the imaging device and the sensor configured to direct a signal to the controller, and
the controller configured to determine an orientation of an item relative to at least one of the first axis and the second axis based at least in part on the signal.

6. An assembly, comprising:
a wiper bar that is elongate along a first axis, the wiper bar being moveable along a second axis, the second axis being perpendicular to the first axis;
a plurality of rollers, the plurality of rollers being configured to support an item as the item travels along the first axis;
an actuator coupled to and moveable with the wiper bar; and
a tab coupled to the actuator, the actuator configured to move the tab in a direction away from a plane defined by the first axis and the second axis,
wherein the wiper bar, the plurality of rollers, the actuator, and the tab are configured to selectively move the item on at least one roller of the plurality of rollers in a direction that is parallel to the second axis.

7. The assembly of claim 6, wherein the actuator is a first actuator, the direction is a first direction, and the assembly further comprises a second actuator, the second actuator being operatively coupled to at least one roller of the plurality of rollers and configured to selectively rotate the at least one roller of the plurality of rollers such that rotation of the at least one roller while the item is supported by the at least one roller causes the item to move in a second direction that is parallel to the first axis.

8. The assembly of claim 6, further comprising:
a frame; and
a guide rod coupled to the frame, the guide rod being elongate along an axis that is parallel to the second axis, the wiper bar movably coupled to the guide rod.

9. The assembly of claim 8, further comprising a motor operatively coupled to the wiper bar and configured to move the wiper bar relative to the guide rod along the second axis.

10. The assembly of claim 9, further comprising a linkage coupling the motor to the wiper bar such that operation of the motor moves the linkage relative to the frame.

11. The assembly of claim 10, wherein the linkage is a first linkage, the first linkage is disposed at a first end of the frame, and the assembly further comprises:
a second linkage disposed at a second end of the frame, the second end of the frame being opposite the first end; and
a third linkage coupling the first and second linkages, the wiper bar fixedly coupled to the first and second linkages.

12. The assembly of claim 9, wherein the motor is a first motor, the first motor is disposed at a first end of the frame, and the assembly further comprises a second motor coupled to the frame at a second end of the frame, the second end of the frame being opposite the first end, wherein the first motor and the second motor are in combination operable to move the wiper bar along the second axis.

13. The assembly of claim 6, wherein the at least one roller of the plurality of rollers comprises a first roller spaced from a second roller by a gap, and the tab and the actuator are configured such that the tab is capable of extending at least partly into the gap.

14. The assembly of claim 6, wherein at least one of the actuator and the tab is rotatable relative to the first axis.

15. The assembly of claim 6, further comprising:
    a controller; and
    at least one of an imaging device and a sensor coupled to the controller,
        the at least one of the imaging device and the sensor configured to direct a signal to the controller, and
        the controller configured to determine an orientation of the item based at least partly on the signal.

16. The assembly of claim 15, further comprising a display coupled to the controller, the display configured to provide first information identifying the item and second information indicative of the orientation.

17. The assembly of claim 6, wherein the plurality of rollers is disposed between the wiper bar and the item when the item is supported by the roller.

18. A method of moving an item using a plurality of rollers, a wiper bar that is elongate along a first axis and moveable along a second axis, the second axis being perpendicular to the first axis, an actuator coupled to and moveable with the wiper bar, and a tab coupled to the actuator, the method comprising:
    moving the tab in a first direction using the actuator, the first direction being away from a plane defined by the first axis and the second axis;
    engaging the item with the tab, the item being disposed on the plurality of rollers; and
    moving the wiper bar along the second axis during the engaging step.

19. The method of claim 18, wherein the plurality of rollers is a first plurality of rollers, the tab is a first tab, the actuator is a first actuator, the wiper bar is a first wiper bar and the method uses a second plurality of rollers, a second wiper bar that is elongate along a third axis and moveable along a fourth axis, the fourth axis being perpendicular to the third axis, a second actuator coupled to and moveable with the second wiper bar, and a second tab coupled to the second actuator, the method further comprising:
    moving the second tab of the second assembly in the first direction using the second actuator;
    engaging the item with the second tab, the item being disposed on the second plurality of rollers;
    moving the second wiper bar along the fourth axis during the step of engaging the item with the second tab; and
    transferring the item from the second plurality of rollers to the first plurality of rollers.

20. The method of claim 18, further comprising:
    determining an orientation of the item relative to at least one of the first axis and the third axis;
    determining, using a controller, that the orientation is outside of an orientation threshold; and
    generating an indication, using the controller, that the orientation is outside of the orientation threshold.

* * * * *